(12) United States Patent
Sugino

(10) Patent No.: US 10,355,464 B2
(45) Date of Patent: Jul. 16, 2019

(54) PROTECTOR AND WIRE HARNESS

(71) Applicant: SUMITOMO WIRING SYSTEMS, LTD., Yokkaichi-shi, Mie (JP)

(72) Inventor: Hidetoshi Sugino, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/307,057

(22) PCT Filed: May 24, 2017

(86) PCT No.: PCT/JP2017/019380
§ 371 (c)(1),
(2) Date: Dec. 4, 2018

(87) PCT Pub. No.: WO2017/212922
PCT Pub. Date: Dec. 14, 2017

(65) Prior Publication Data
US 2019/0140433 A1    May 9, 2019

(30) Foreign Application Priority Data

Jun. 8, 2016    (JP) .................................. 2016-114090

(51) Int. Cl.
*B60R 16/02* (2006.01)
*H02G 3/04* (2006.01)
*H01B 7/00* (2006.01)

(52) U.S. Cl.
CPC ....... *H02G 3/0481* (2013.01); *B60R 16/0215* (2013.01); *H01B 7/0045* (2013.01)

(58) Field of Classification Search
CPC .......................... B60R 16/0215; H01B 7/0045
USPC .................................................. 174/72 A, 650
See application file for complete search history.

(56) References Cited

U.S. PATENT DOCUMENTS

| 2012/0298404 | A1* | 11/2012 | Tokunaga | B60R 16/0215 |
|---|---|---|---|---|
| | | | | 174/135 |
| 2014/0338971 | A1* | 11/2014 | Yoshida | H01B 7/0045 |
| | | | | 174/72 A |
| 2015/0334882 | A1 | 11/2015 | Sugino | |
| 2016/0071630 | A1 | 3/2016 | Sugino | |

FOREIGN PATENT DOCUMENTS

| JP | 2004-171952 A | 6/2004 |
|---|---|---|
| JP | 2006-310127 A | 11/2006 |
| JP | 2015-220006 A | 12/2015 |
| JP | 2016-054031 A | 4/2016 |
| JP | 2016-58137 A | 4/2016 |

OTHER PUBLICATIONS

Aug. 8, 2018 International Search Report issued in International Patent Application No. PCT/JP2017/019380.

* cited by examiner

*Primary Examiner* — Sherman Ng
(74) *Attorney, Agent, or Firm* — Oliff PLC

(57) ABSTRACT

A protector configured to be attached to an end portion of a pipe, the protector including a housing in which a connector where a first wire that is inserted through an inside of the pipe and a second wire that is disposed outside the pipe are connected to each other can be housed outside the pipe, and a displacement restrictor that can restrict displacement of the first wire in a radial direction by coming into contact with an outer circumferential surface of the first wire.

6 Claims, 16 Drawing Sheets

PROTECTOR AND WIRE HARNESS

This application is the U.S. National Phase of PCT/JP2017/019380 filed May 24, 2017, which claims priority from JP 2016-114090 filed Jun. 8, 2016, the entire disclosure of which is incorporated herein by reference.

BACKGROUND

The present disclosure relates to a protector and a wire harness.

Conventionally, a wire harness in which, as disclosed in JP 2004-171952A, for example, a wire is inserted through a pipe made of metal for the purpose of wire protection and noise shielding is known. Also, a wire harness of this type in which, as disclosed in JP2016-54031A, for example, a single-core wire, which has a smaller diameter than a stranded wire, is inserted through the inside of a pipe in order to reduce the pipe diameter is known. A flexible stranded wire is disposed outside the pipe, and the single-core wire and the stranded wire are connected to each other outside the pipe through soldering, welding, or the like.

SUMMARY

However, a configuration in which a wire inserted through the inside of a pipe and a wire disposed outside the pipe are connected to each other outside the pipe as described above has the problem in that, if the wire on the outside is bent in a perpendicular direction, a force that acts in a separating direction is applied to a joint portion between the two wires. Nevertheless, it is not desirable to house the connecting portion between the two wires inside the pipe, because the diameter of the pipe is inevitably increased.

An exemplary aspect of the disclosure provides a protector and a wire harness with which it is possible to protect a connecting portion between a wire inserted through the inside of a pipe and a wire disposed outside the pipe without increasing the diameter of the pipe.

A protector of the present disclosure is a protector configured to be attached to an end portion of a pipe, the protector including a housing in which a connector where a first wire that is inserted through an inside of the pipe and second wire that is disposed outside the pipe are connected to each other can be housed outside the pipe.

A wire harness of the present disclosure includes a pipe, a first wire that is inserted through the inside of the pipe, a second wire that is disposed outside the pipe, and the above-described protector.

According to the present disclosure, the connector between the first wire and the second wire is housed in and protected by the housing portion of the protector, and thus, the connector between the first wire and the second wire need not be housed in the pipe. Accordingly, it is possible to protect a connector between a wire inserted through the inside of a pipe and a wire disposed outside the pipe without increasing the diameter of the pipe.

DETAILED DESCRIPTION OF EMBODIMENTS

Figure 1:
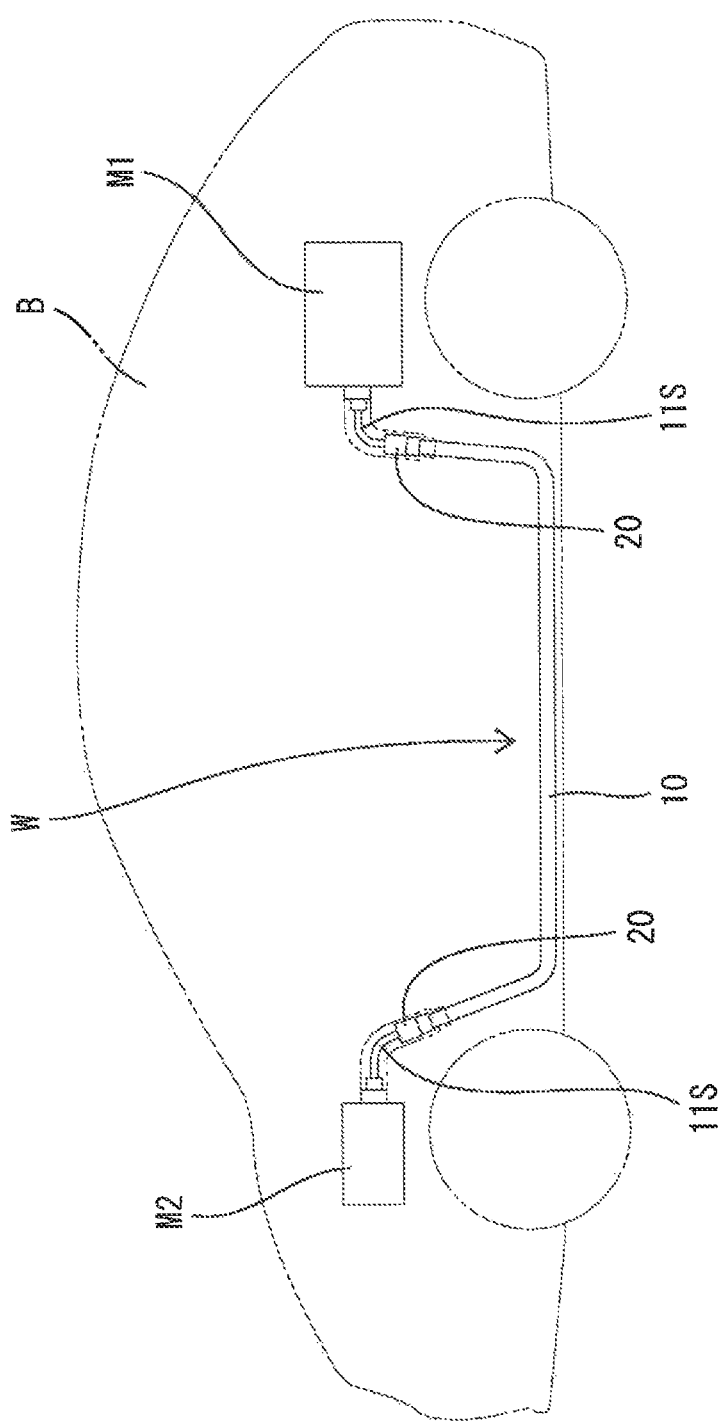
FIG. 1 is a schematic diagram showing a state in which a wire harness according to Embodiment 1 is attached to a vehicle.
Figure 2:
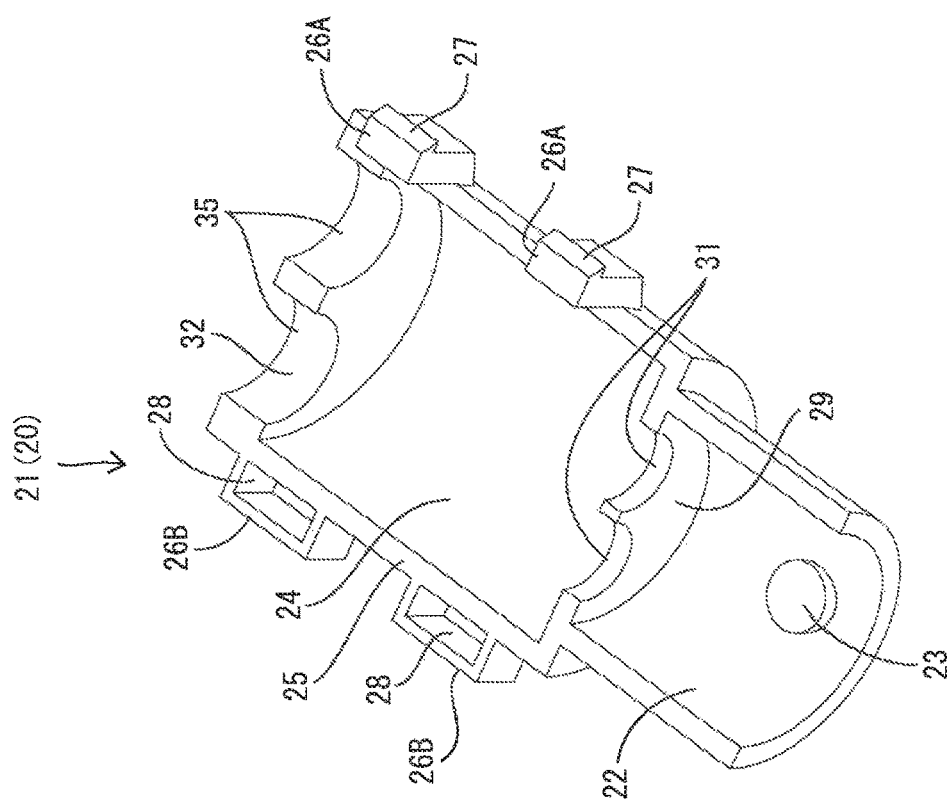
FIG. 2 is a perspective view showing a divided body of a protector.

Preferred embodiments of the present disclosure will be described below.

The protector according to the present disclosure further has a displacement restricting portion (displacement restrictor) that can restrict displacement of the first wire in a radial direction by coming into contact with an outer circumferential surface of the first wire. With this configuration, it is possible to prevent the first wire from being displaced in the radial direction, abutting against an end edge of the pipe, and thus being damaged.

Also, the protector according to the present disclosure further has a bending restricting portion (bending restrictor)

that can restrict bending of the second wire by coming into contact with an outer circumferential surface of the second wire. With this configuration, it is possible to reliably prevent a force that is generated by the second wire being shaken from acting on the connecting portion.

Also, in the protector according to the present disclosure, the bending restricting portion may have a relatively large thickness compared with other portions.

Also, the wire harness according to the present disclosure further includes an insulating member (insulator) that encloses a connecting portion where the first wire and the second wire are connected to each other, and a stopper portion that is provided in the protector and prevents the connecting portion from coming out by engaging with an axial end edge of the insulating member. With this configuration, it is possible to keep the connecting portion within the housing portion (housing).

Also, in the wire harness according to the present disclosure, an axial clearance is provided between the housing portion and the connecting portion (connector). With this configuration, the dimensional tolerance or the like can be accommodated.

Also, in the wire harness according to the present disclosure, a configuration may also be adopted in which the pipe can be divided over the entire length thereof. With this configuration, an operation for inserting the wire all the way from one end to the other end of the pipe need not be performed, and therefore, an operation for manufacturing the wire harness can be easily performed.

Embodiment 1

Hereinafter, Embodiment 1 of the present disclosure will be described in detail with reference to FIGS. 1 to 11.

A wire harness W according to this embodiment is routed under the floor of a vehicle body B of a vehicle such as a hybrid vehicle in order to connect, for example, a device M1, such as a high-voltage battery, provided in a rear portion of the vehicle body B and a device M2, such as an inverter or a fuse box, provided in a front portion of the vehicle body B to each other.

The wire harness W is a pipe harness including a pipe 10, first wires 11F inserted through the inside of the pipe 10, second wires 11S disposed outside the pipe 10, and protectors 20 attached to end portions of the pipe 10. The first wires 11F have a relatively small diameter, and the second wires 11S have a relatively large diameter. Note that the second wires 11S are each enclosed by any shielding member, such as a braided member that is formed by braiding a conductive thin metal wire into a tube-shaped mesh.

The pipe 10 is a shielding pipe made of a metal (iron, aluminum, copper, stainless steel, or the like) and has a tubular shape that encloses a plurality (two, in this embodiment) of first wires 11F collectively. The pipe 10 has an elongated shape with a circular cross-section, and is bent in three dimensions so as to extend along a wiring route of the first wires 11F, and a large portion thereof is disposed under the floor of the vehicle body B.

Figure 7:
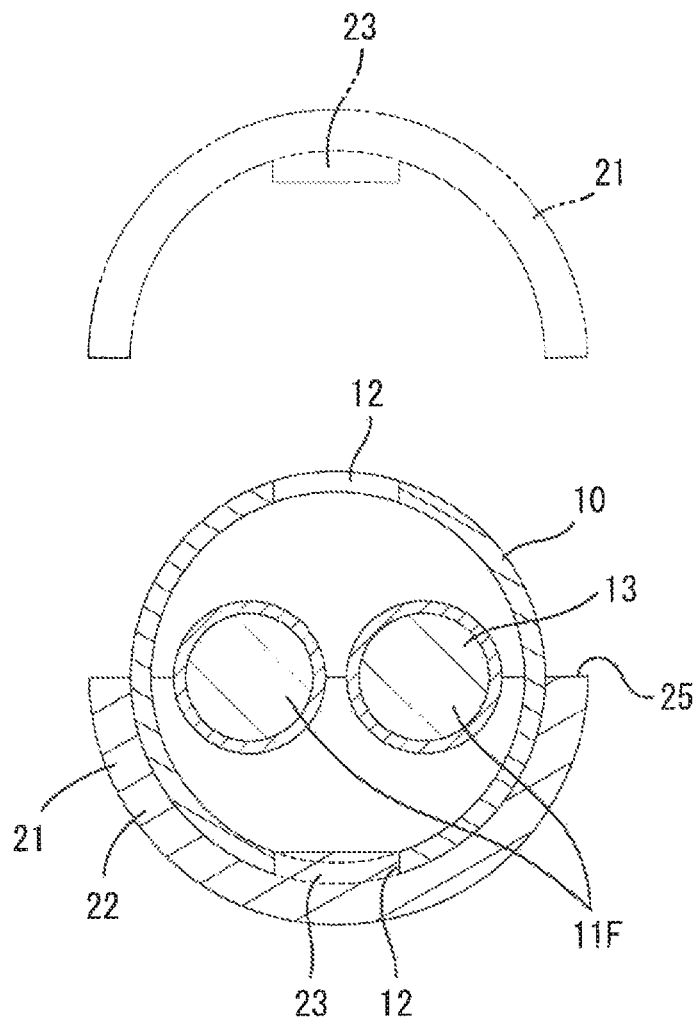
FIG. 7 is a cross-sectional view of the wire harness showing a manner in which the protector is attached thereto and corresponds to a cross section at a position indicated by arrows A-A in FIG. 5.

Engagement receiving portions 12 into which engagement portions 23 of the protector 20 can be fitted are provided in both end portions of the pipe 10 (see FIG. 7). The engagement receiving portions 12 are through holes that penetrate the pipe 10 in an inside-outside direction and have a circular shape. The engagement receiving portions 12 are arranged such that a pair of engagement receiving portions 12 are provided opposing each other on opposite sides of the pipe 10 in the radial direction and are symmetrical with each other about the central axis of the pipe 10.

The first wires 11F each include a single-core conductor (hereinafter referred to as "first conductor 13") constituted by a single metal rod, and an insulating coating that encloses the first conductor 13, and have relatively high rigidity and are difficult to bend. The first conductor 13 is formed of copper, aluminum, or the like. The first wires 11F are longer than the overall length of the pipe 10, and both end portions thereof are lead out of the pipe 10. At both end portions of the first wires 11F, the insulating coatings are removed, and the first conductors 13 are exposed.

The second wires 11S are flexible wires that each include a stranded conductor (hereinafter referred to as "second conductor 14") formed by helically twisting a plurality of strands together and an insulating coating that encloses the second conductor 14, and have low rigidity and are easy to bend. The second conductor 14 is formed of copper, aluminum, or the like. At both end portions of the second wires 11S, the insulating coatings are removed, and the second conductors 14 are exposed. One of the two end portions of each second wire 11S is connected to an end portion of one of the corresponding first wires 11F, and the other end portion is connected to a terminal fitting, which is not shown.

Figure 6:
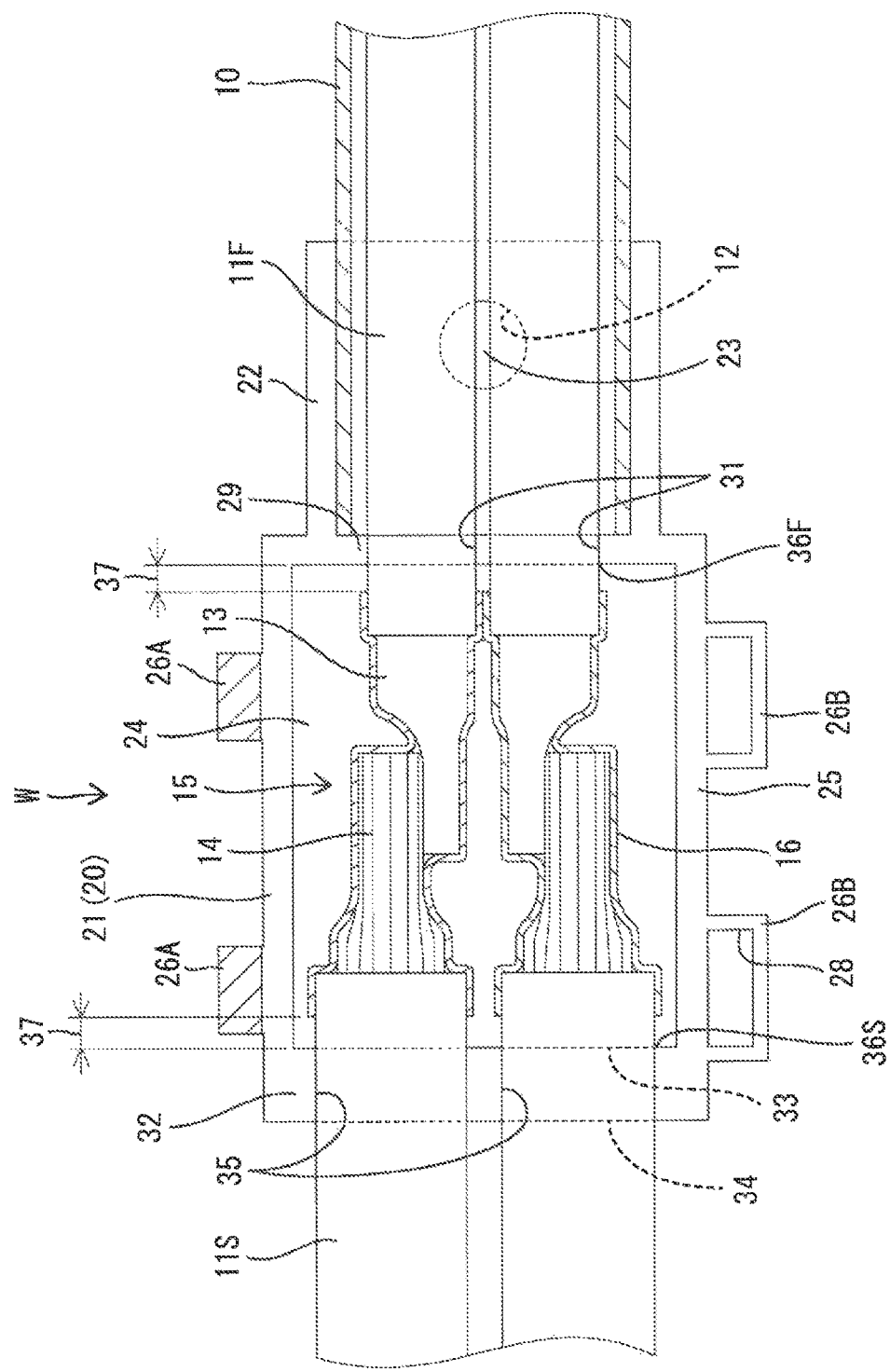
FIG. 6 is a partially enlarged cross-sectional view showing the wire harness with the divided body of the protector attached thereto.

The first wires 11F and the second wires 11S are connected outside the pipe 10 such that electrical conduction can be established. As shown in FIG. 6, in a connecting portion 15 where a first conductor 13 and a second conductor 14 are connected, an exposed portion of the first conductor 13 and an exposed portion of the second conductor 14 are laid one on top of the other in the radial direction and joined together through soldering, welding, or the like.

Each connecting portion 15 where a first wire 11F and a second wire 11S are connected is enclosed by an insulating member 16. The insulating member 16 is a heat-shrinkable tube or the like, for example, and is attached so as to tightly cover a region spanning between the insulating coating of the first wire 11F and the insulating coating of the second wire 11S (i.e., firmly adheres to the connecting portion 15 and is undisplaceable in the axial direction). Thus, the connecting portions 15 where the first wires 11F and the second wires 11S are connected are kept in an insulated and sealed state.

The protectors 20 are made of a synthetic resin and have a divided structure in which divided bodies 21 having identical shapes are combined. The divided structure of each protector 20 enables an operation for housing the connecting portions 15 in the protector 20 and attaching the protector 20 to the pipe 10 to be easily performed.

Figure 8:
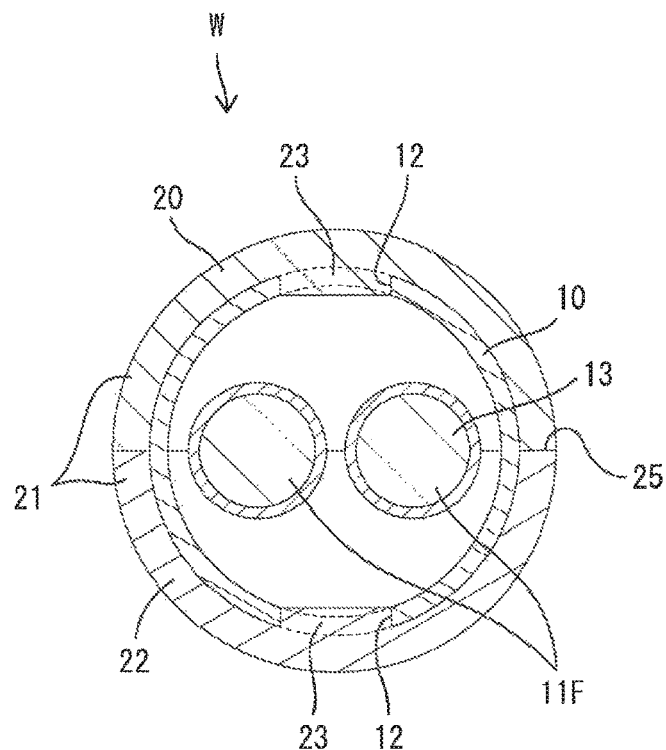
FIG. 8 is a cross-sectional view of the wire harness showing a state in which the protector is attached thereto and corresponds to the cross section at the position indicated by arrows A-A in FIG. 5.

Each protector 20 includes a fixing portion 22 to be fixed to the pipe 10. As shown in FIG. 7, in each divided body 21, the fixing portion 22 has a semicircular shape that can be externally fitted to an end portion of the pipe 10. The inner circumferential surface of the fixing portion 22 is formed as a circular arc surface that conforms to the outer circumferential surface of the pipe 10. In a state in which the divided bodies 21 are combined, the fixing portion 22 forms a cylindrical shape that can be externally fitted to the end portion of the pipe 10 as shown in FIG. 8.

The fixing portion 22 is provided with an engagement portion 23 that can be fitted into an engagement receiving portion 12 of the pipe 10. The engagement portion 23 is positioned at the center of the fixing portion 22 in the circumferential direction. The engagement portion 23 is a protrusion that protrudes from the inner circumferential surface of the fixing portion 22, and has a flat column-like shape with a circular cross section that matches the engagement receiving portion 12. The protruding dimension of the engagement portion 23 is set to be equal to the thickness of the pipe 10.

Figure 5:
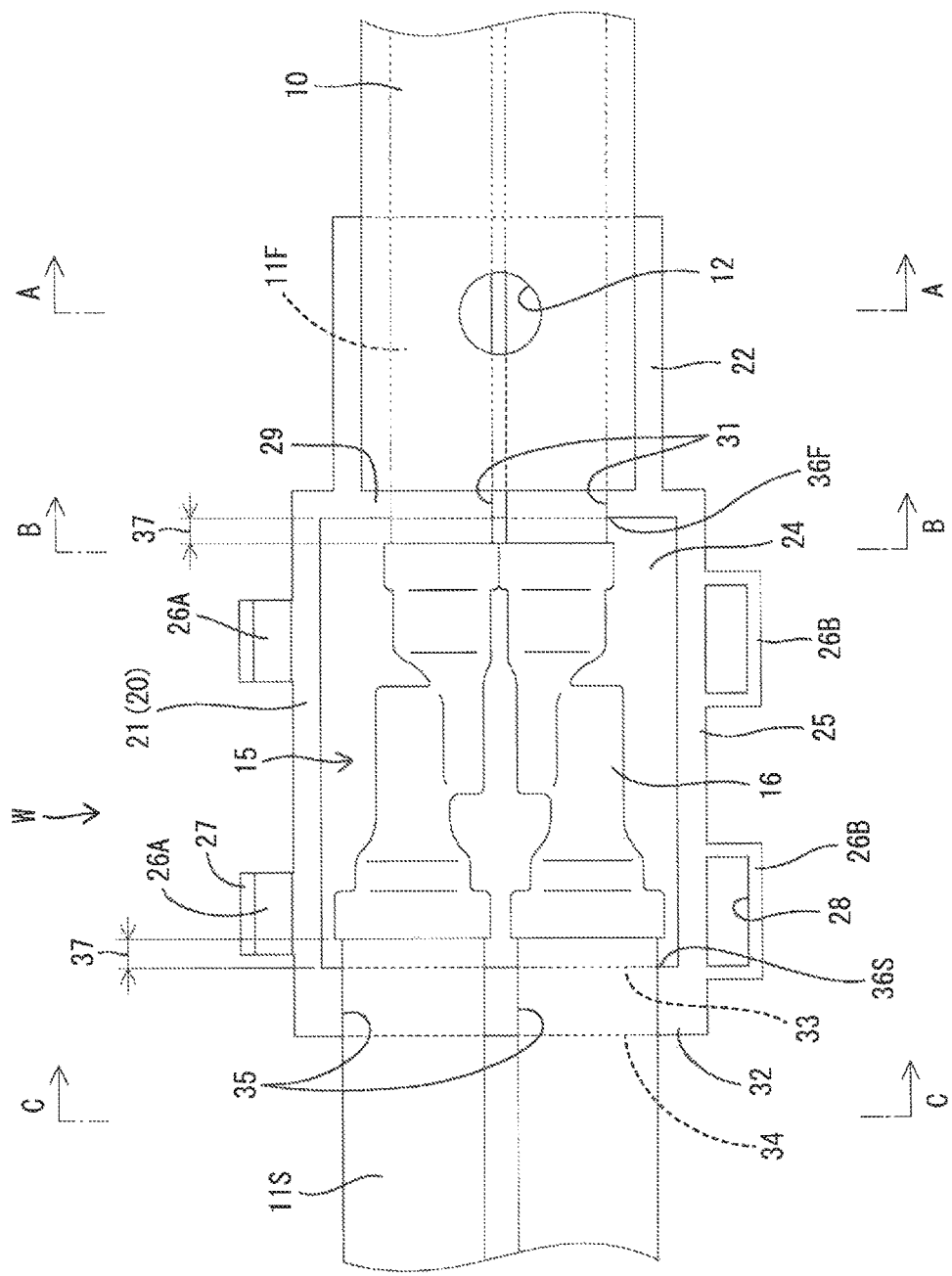
FIG. 5 is a partially enlarged plan view showing the wire harness with the divided body of the protector attached thereto.
Figure 9:
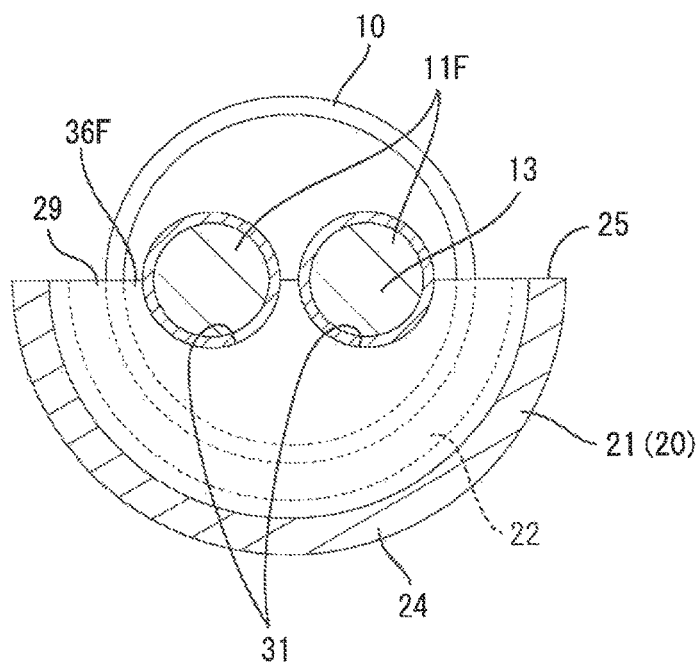
FIG. 9 is a cross-sectional view showing the wire harness with divided bodies of the protector attached thereto and corresponds to a cross section at a position indicated by arrows B-B in FIG. 5.

As shown in FIG. 5, each protector 20 has a housing portion 24 in which the connecting portions 15, where the first wires 11F and the second wires 11S are connected, can be housed. In a state in which the protector 20 is fixed to an end portion of the pipe 10, the housing portion 24 is disposed outward of the pipe 10 with respect to the axial direction. As shown in FIG. 9, in each divided body 21, the housing portion 24 has a semicircular shape that is larger than the fixing portion 22 in an outward radial direction, and the connecting portions 15 that have a large width compared with the first wires 11F and the second wires 11S can be housed in the housing portion 24. In a state in which the divided bodies 21 are combined, the housing portion 24 as a whole forms a cylindrical overall shape that is larger than the fixing portion 22 and the pipe 10. Note that the wall thickness of the housing portion 24 is set to be equal to the wall thickness of the fixing portion 22.

Abutment surfaces 25 that abut against each other when divided bodies 21 are combined are each a flat surface with no difference in level throughout the surface from the fixing portion 22 to the housing portion 24. When a divided body 21 is viewed from the abutment surface 25 side, as shown in FIG. 5, both the housing portion 24 and the fixing portion 22 have rectangular shapes, and the housing portion 24 has larger dimensions than the fixing portion 22 in the axial direction and the width direction.

Figure 4:
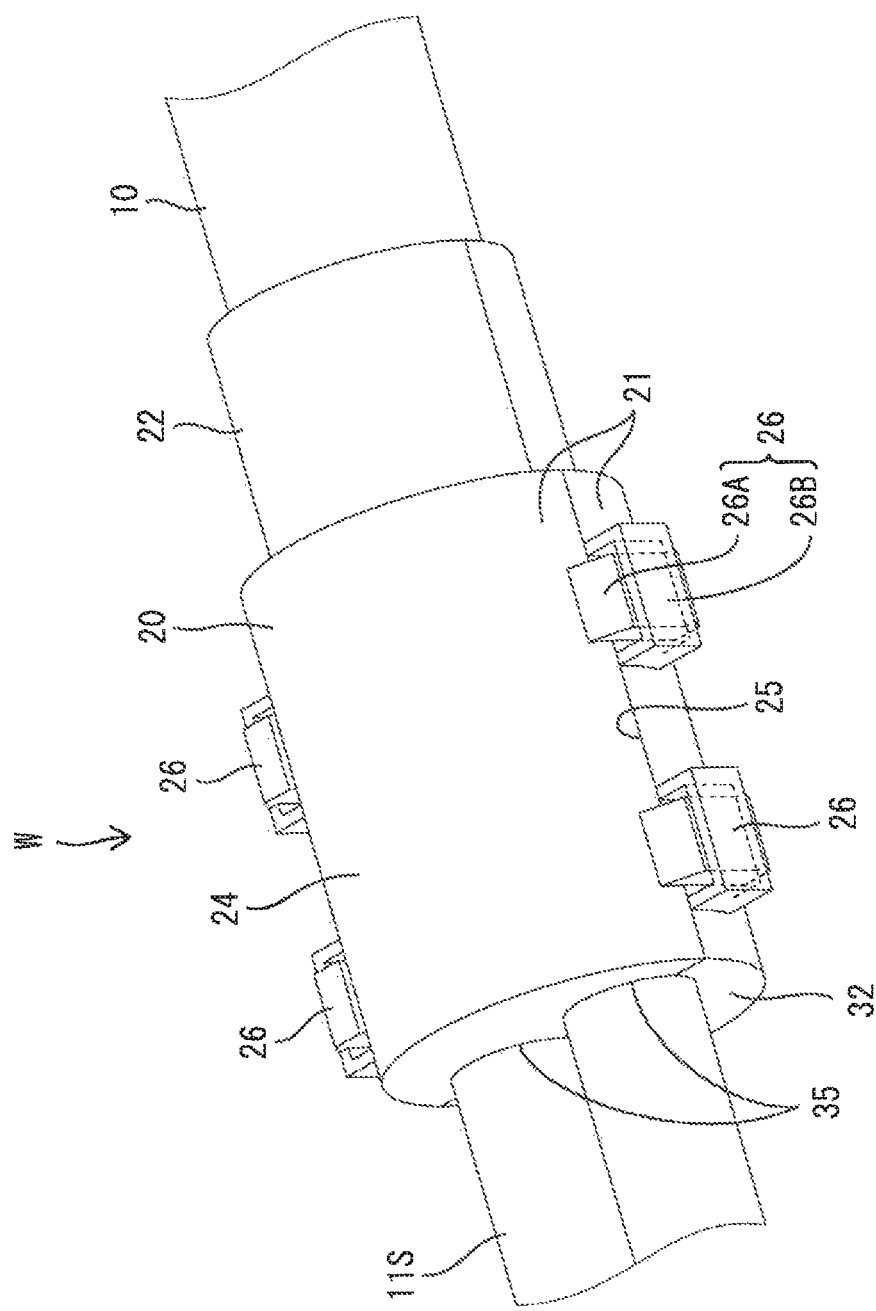
FIG. 4 is a partially enlarged perspective view showing the wire harness with the protector attached thereto.

Each protector 20 includes a lock structure 26 that keeps the divided bodies 21 in a combined state (see FIG. 4). A plurality of (four, in this embodiment) lock structures 26 are provided in the housing portion 24. The lock structures 26 each have a lock portion 26A and a lock receiving portion 26B that are engageable with each other. A single divided body 21 is provided with both the lock portions 26A and the lock receiving portions 26B. The lock portion 26A protrudes from the abutment surface 25 in a combining direction (circumferential direction) of the divided body 21, and a claw portion 27 protrudes from an outer surface of a protruding end portion of the lock portion 26A. The lock receiving portion 26B has a hole portion 28 that allows a mating lock portion 26A to pass through, and a locked state is established as a result of the claw portion 27 engaging with a peripheral edge portion of the hole portion 28.

Figure 3:
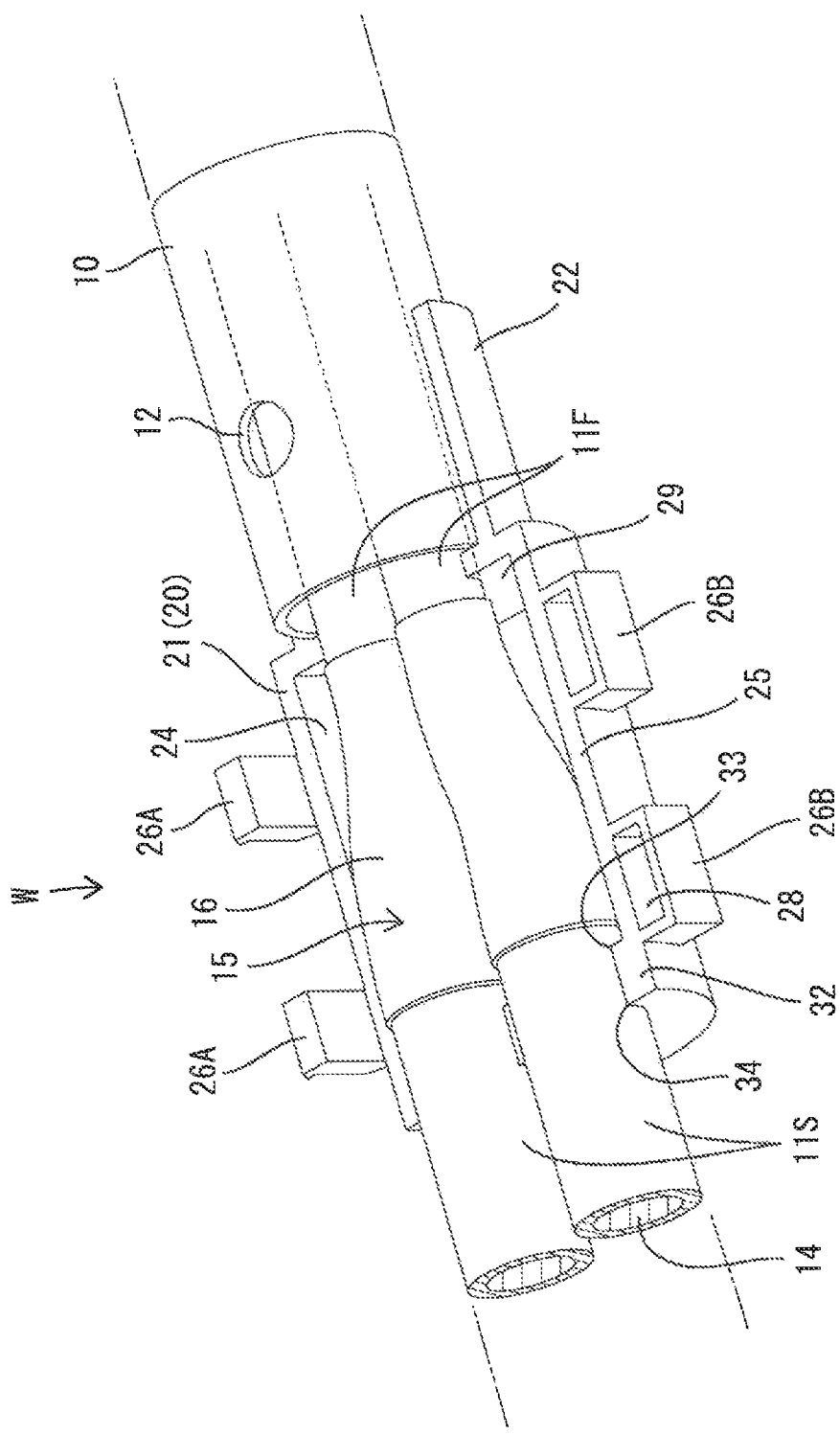
FIG. 3 is a partially enlarged perspective view showing the wire harness with the divided body of the protector attached thereto.

As shown in FIG. 3, each protector 20 has a displacement restricting portion 29 that can restrict the displacement of the first wires 11F in the radial direction by coming into contact with the outer circumferential surfaces of the first wires 11F. The displacement restricting portion 29 has a wall-like shape that separates the fixing portion 22 and the housing portion 24 from each other, and traverses each divided body 21 in the width direction thereof (direction that is perpendicular to the axis thereof). In a state in which the protector 20 is attached to the pipe 10, an end surface of the pipe 10 is disposed in close proximity to a wall surface of the displacement restricting portion 29 as shown in FIG. 5, and is covered by the displacement restricting portion 29 as shown in FIG. 9. Both of the surfaces of the displacement restricting portion 29 that are located on the housing portion 24 side and the fixing portion 22 side, respectively, are substantially perpendicular to the axial direction. Note that the thickness (axial dimension) of the displacement restricting portion 29 is set to be equal to the thicknesses of the fixing portion 22 and the housing portion 24.

As shown in FIG. 9, the displacement restricting portion 29 has first fitting portions 31 into which the first wires 11F can be individually fitted. The first fitting portions 31 are formed as recesses that are arranged side-by-side in the abutment surface 25 of the displacement restricting portion 29. Each first fitting portion 31 has a circular arc shape that conforms to the outer circumferential surface of the first wire 11F, and has a diameter that is equal to the outer diameter of the first wire 11F. In a state in which the divided bodies 21 are combined, through holes that have a circular shape and that are closed around their entire circumferences are formed by the first fitting portions 31. The through holes formed by the first fitting portions 31 are arranged near the center when viewed in the axial direction and are unlikely to be touched by an end edge of the pipe 10.

As shown in FIG. 3, each protector 20 has a bending restricting portion 32 that can restrict the bending of the second wires 11S by coming into contact with the outer circumferential surfaces of the second wires 11S. The bending restricting portion 32 has a wall-like shape such that it closes one end side (the opposite side to the fixing portion 22) of the housing portion 24 in the axial direction, and traverses each divided body 21 in the width direction thereof (direction that is perpendicular to the axis thereof). A surface of the bending restricting portion 32 that is located on the housing portion 24 side is substantially perpendicular to the axial direction.

The wall thickness (axial dimension) of the bending restricting portion 32 is set to be large compared with the thicknesses of the other portions of the protector 20. In other words, in the bending restricting portion 32, the dimension between an inner contact portion 33 that can come into contact with an inner side of the outer circumferential surfaces of the second wires 11S with respect to the inside-outside direction of the housing portion 24 and an outer contact portion 34 that can come into contact with an outer side of the outer circumferential surfaces of the second wires 11S is set to be larger than the thicknesses of the housing portion 24 and the displacement restricting portion 29.

Figure 10:
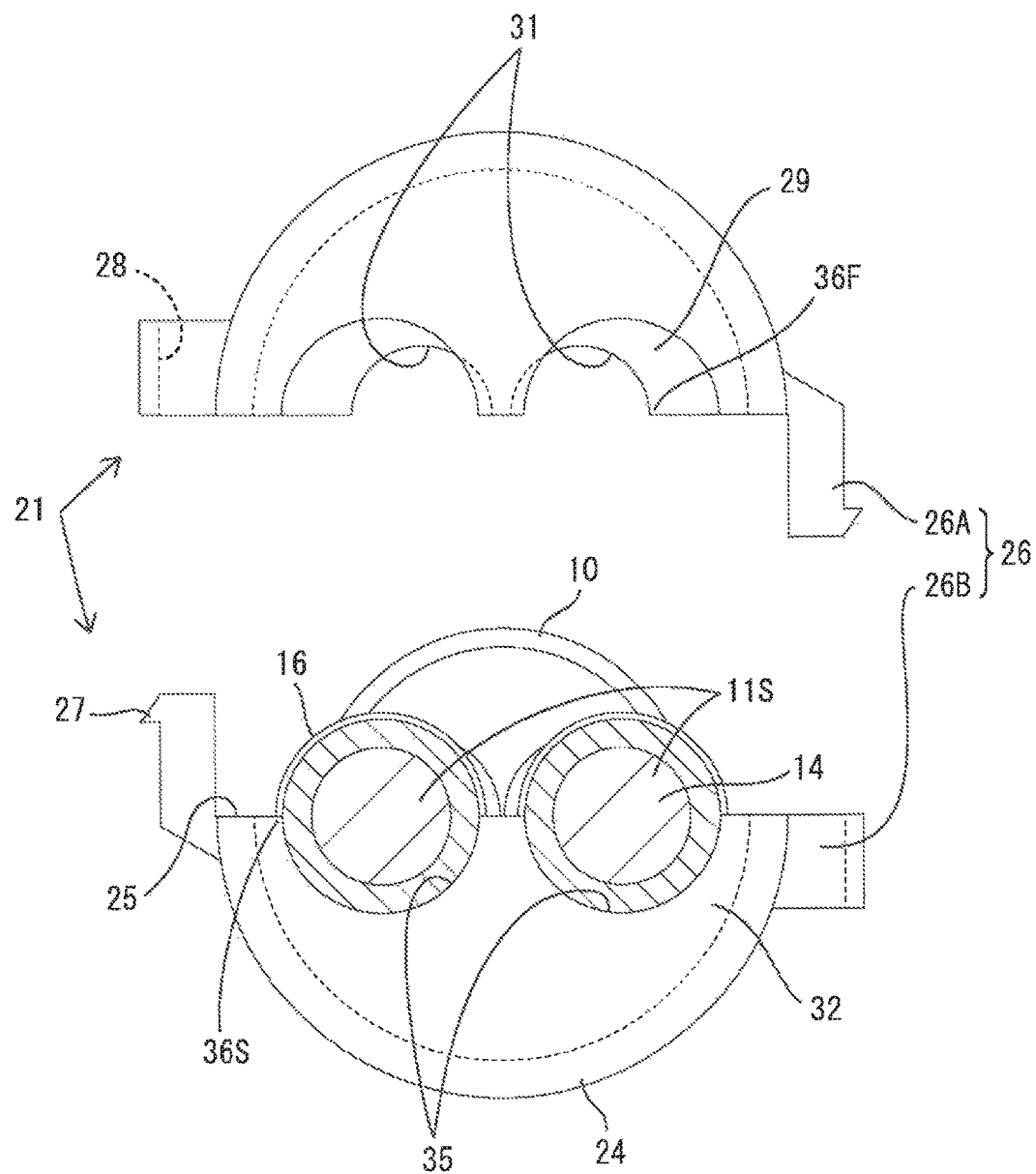
FIG. 10 is a cross-sectional view of the wire harness showing a manner in which the protector is attached thereto and corresponds to a cross section at a position indicated by arrows C-C in FIG. 5.
Figure 11:
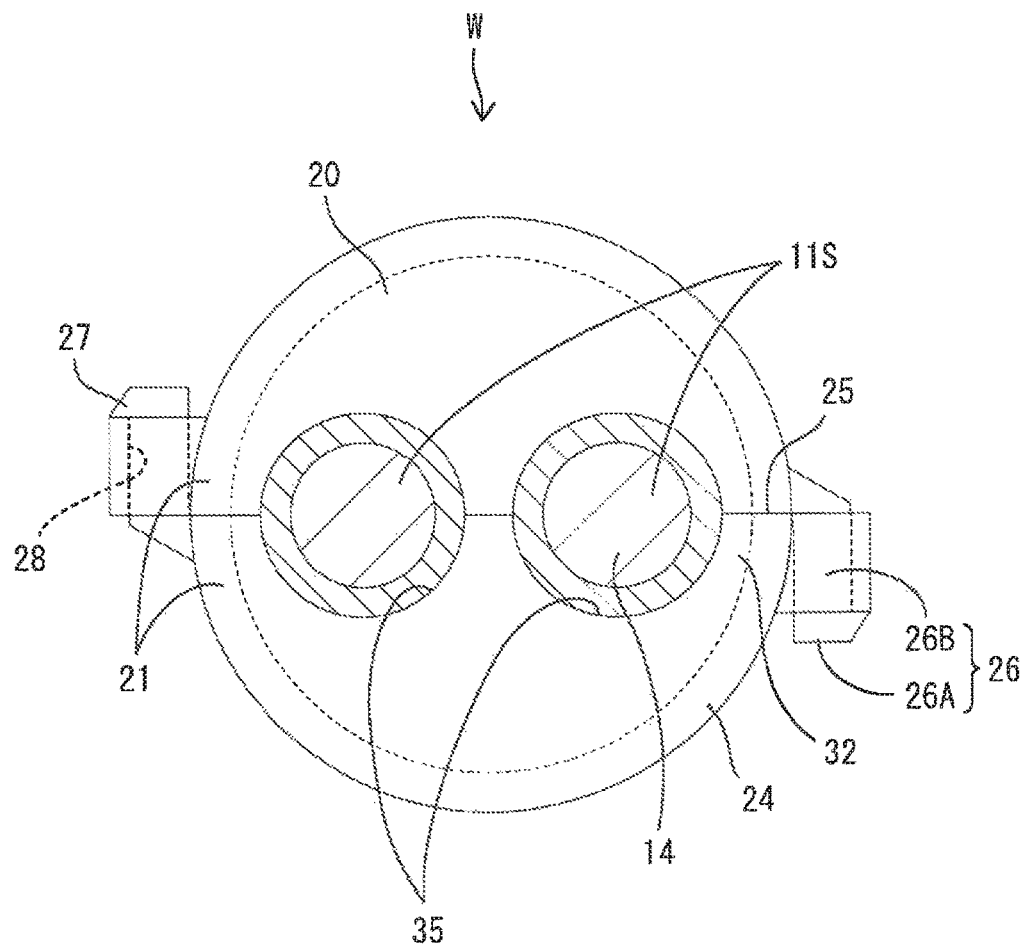
FIG. 11 is a cross-sectional view of the wire harness showing a state in which the protector is attached thereto and corresponds to the cross section at the position indicated by arrows C-C in FIG. 5.
Figure 12:
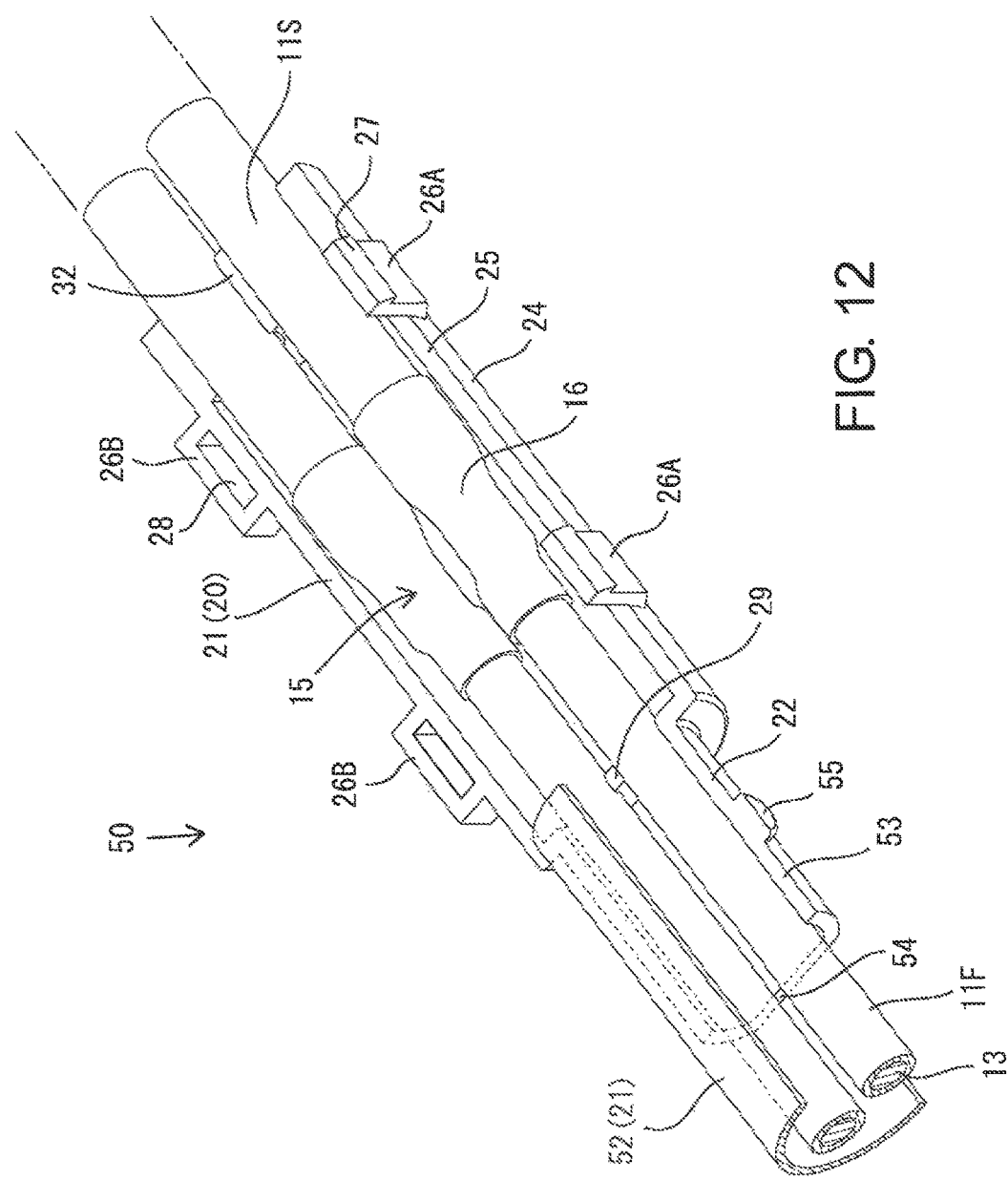
FIG. 12 is a partially enlarged perspective view showing a wire harness according to Embodiment 2 with a divided body of a protector attached thereto.
Figure 13:
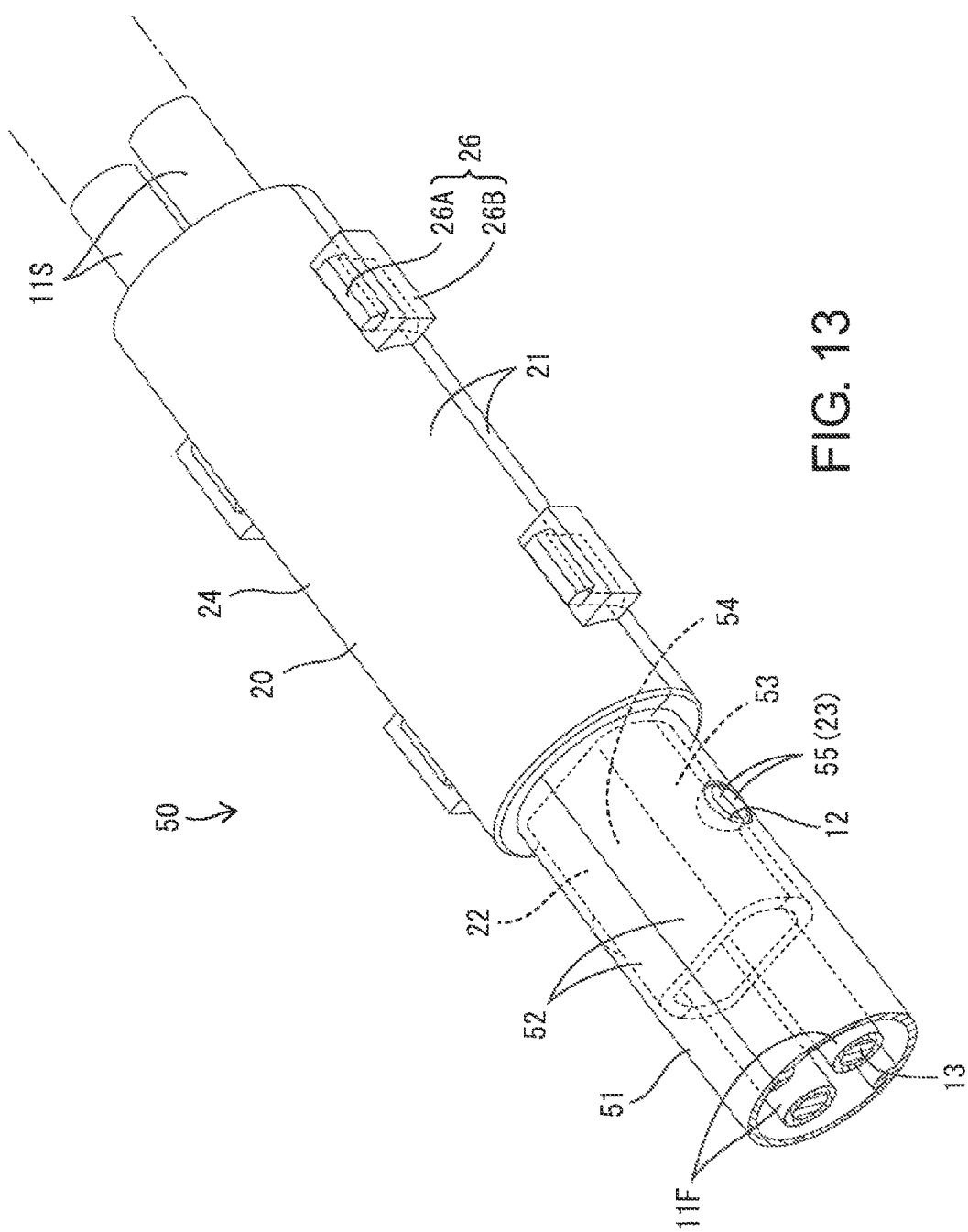
FIG. 13 is a partially enlarged perspective view showing the wire harness with the protector attached thereto.
Figure 14:
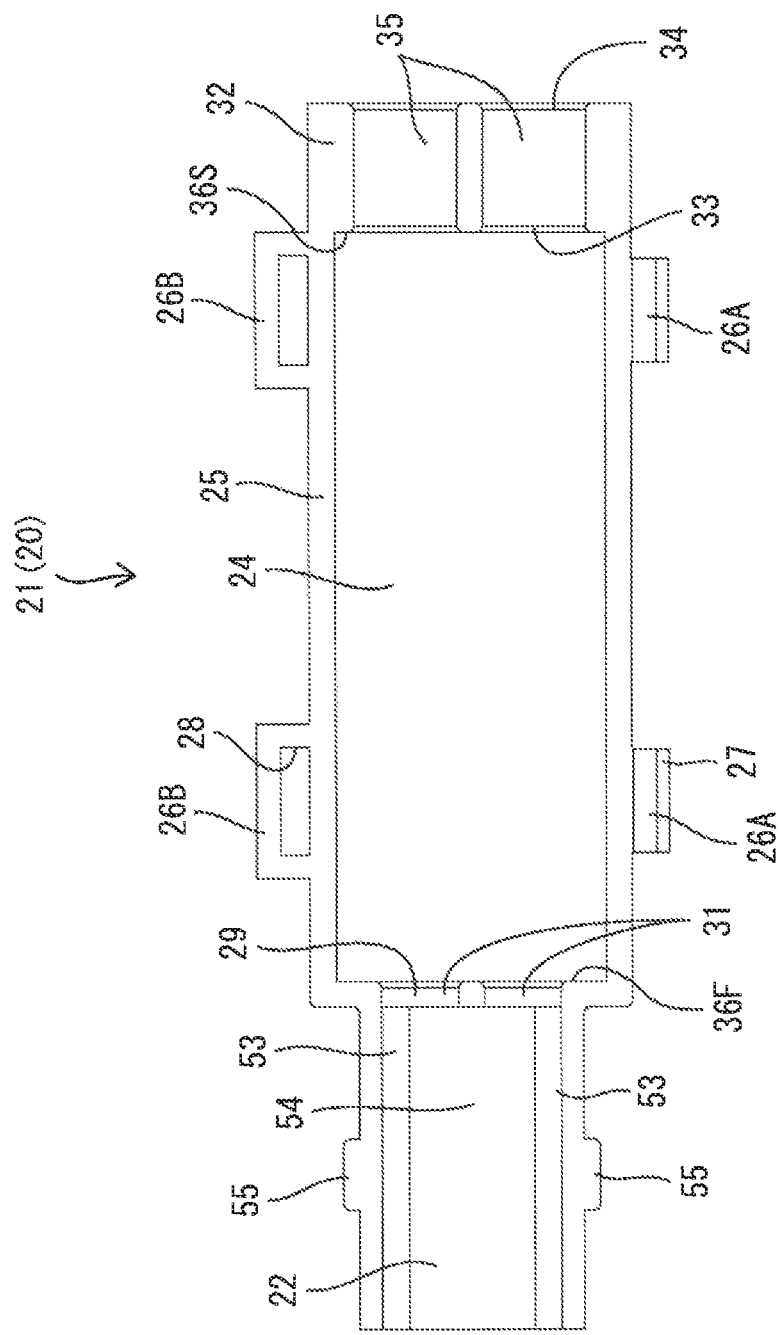
FIG. 14 is a plan view showing the divided body of the protector.
Figure 15:
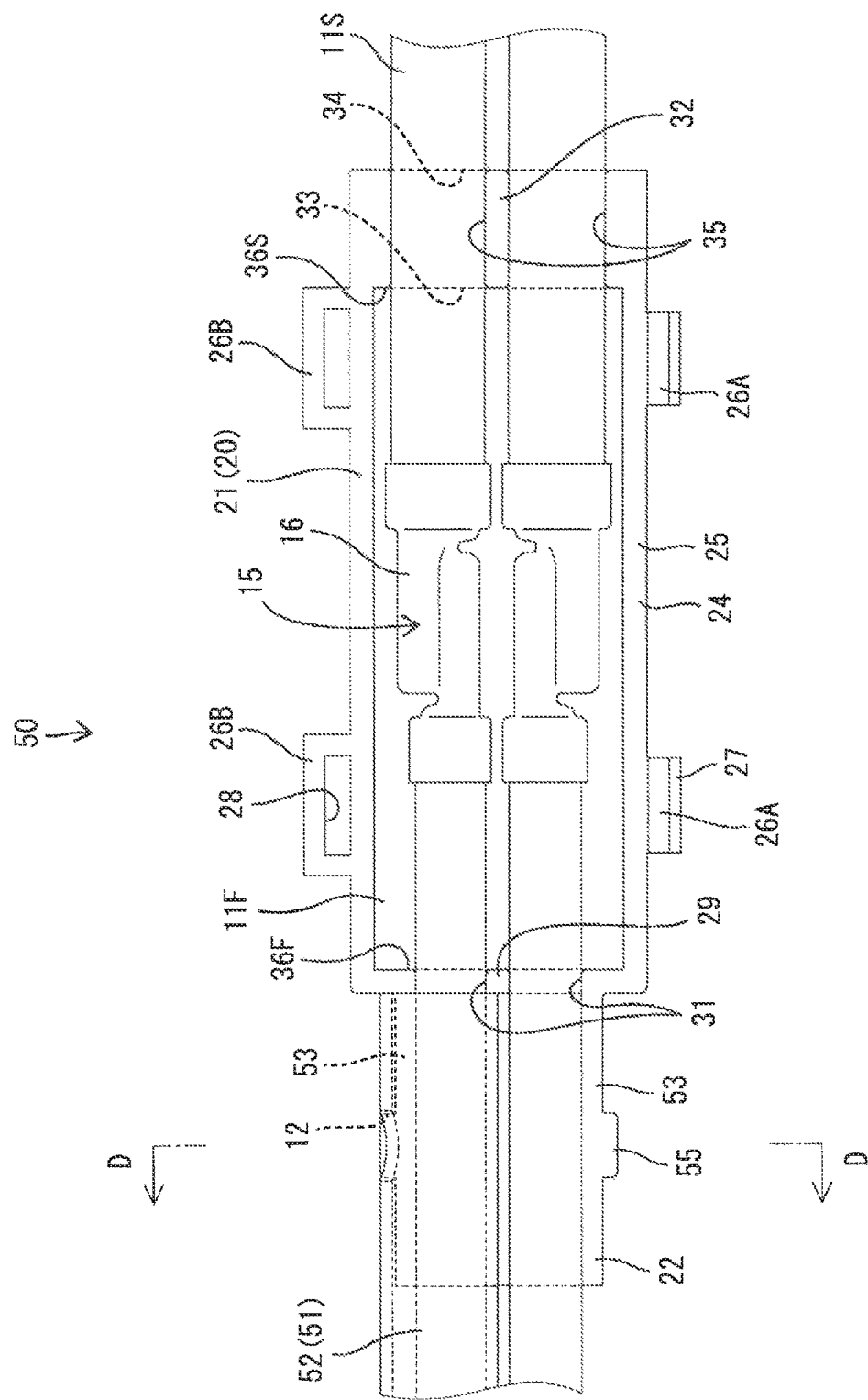
FIG. 15 is a partially enlarged plan view showing the wire harness with the divided body of the protector attached thereto.

As shown in FIG. 10, the bending restricting portion 32 has second fitting portions 35 into which the second wires 11S can be individually fitted. The second fitting portions 35 are formed as recesses that are arranged side-by-side in the abutment surface 25 of the bending restricting portion 32. Each second fitting portion 35 has a circular arc shape that conforms to the outer circumferential surface of the second wire 11S, and has a diameter that is equal to the outer diameter of the second wire 11S. The diameter of the second fitting portions 35 is larger than the diameter of the first fitting portions 31, and the distance between the adjacent second fitting portions 35 are larger than the distance between the adjacent first fitting portions 31. In a state in which the divided bodies 21 are combined, through holes that have a circular shape and that are closed around their entire circumferences are formed by the second fitting portions 35. Since the thickness between the inner contact portion 33 and the outer contact portion 34 is set to be large, and the area of a portion of the bending restricting portion 32 that can come into contact with the second wires 11S is thus relatively increased, portions (portions fitted into the second fitting portions 35) of the second wires 11S that are sandwiched between the bending restricting portions 32 of the pair of divided bodies 21 are kept in a straight-line shape even when the second wires 11S are shaken outside the protector 20.

As shown in FIG. 5, each protector 20 includes a first stopper portion 36F and a second stopper portion 36S that engage with both axial end edges of the insulating members 16 and prevent the connecting portions 15 from coming out. The first stopper portion 36F and the second stopper portion 36S can prevent the connecting portions 15 from coming out of the housing portion 24 in the axial direction and retain the connecting portions 15 within the housing portion 24, by abutting against both axial end edges of the insulating members 16.

The first stopper portion 36F engages with the end edges of the insulating members 16 that are located on the first wire 11F side, and the second stopper portion 36S engages with the end edges on the second wire 11S side. The first stopper portion 36F is constituted by peripheral edge portions of the first fitting portions 31 of the displacement restricting portion 29, and the second stopper portion 36S is constituted by peripheral edge portions of the second fitting portions 35 of the bending restricting portion 32.

As shown in FIG. 5, axial clearances 37 are provided between the housing portion 24 and the connecting portions 15. In other words, the clearances 37 are provided between both end edges of the insulating members 16 and the first stopper portion 36F and the second stopper portion 36S. That is to say, the axial dimension of the inside of the housing portion 24 is set to be larger than the axial dimension of the connecting portions 15 by an amount corresponding to the clearances 37, and the dimensional tolerance or the like can be accommodated by the connecting portions 15 moving inside the housing portion 24 in the axial direction within the range of the clearances 37.

Next, an example of an operation for manufacturing the wire harness W of this embodiment will be described.

First, the first wires 11F are inserted through the pipe 10. A first wire 11F is connected to a corresponding second wire 11S at one end portion of both end portions thereof, and then, the other end portion of the first wire 11F on the side that is not connected to the second wire 11S is inserted into the pipe 10 and drawn out from the opposite end side of the pipe 10. Then, another second wire 11S is connected to the first wire 11F at the other end portion that is drawn out from the opposite end side of the pipe 10. In this manner, both end portions of the first wire 11F are connected to the respective second wires 11S, and the connecting portions 15 between the wires 11F and 11S are disposed at respective positions that are in close proximity to the outer side of both end edges of the pipe 10.

Subsequently, the protectors 20 are attached to the respective end portions of the pipe 10.

First, one divided body 21 is attached to an end portion of the pipe 10. The engagement portion 23 of the divided body 21 is fitted into the engagement receiving portion 12 of the pipe 10. Thus, the divided body 21 is positioned relative to the pipe 10 in the circumferential direction and the axial direction. Then, the first wires 11F are fitted into the first fitting portions 31, and the second wires 11S are fitted into the second fitting portions 35, and the connecting portions 15 are disposed inside the housing portion 24.

Next, another divided body 21 is combined with the above-described divided body 21 and attached to the end portion of the pipe 10. The other divided body 21 is attached so as to cover an opening side of the above-described divided body 21. The engagement portion 23 is fitted into the engagement receiving portion 12, and the lock structures 26 are locked. Each lock portion 26A passes through the hole portion 28 of a mating lock receiving portion 26B in the combining direction, and the claw portion 27 is engaged with the lock receiving portion 26B. Moreover, the abutment surfaces 25 of the divided bodies 21 abut against each other, and the first fitting portions 31 and the second fitting portions 35 of the other divided body 21 are fitted to the first wires 11F and the second wires 11S. Thus, the connecting portions 15 are housed in the housing portion 24 in a hermetically sealed manner.

After the protectors 20 are attached to both end portions of the pipe 10 in the above-described manner, the pipe 10 is bent (plastically deformed) using a bending machine.

Thus, the operation for manufacturing the wire harness W is completed.

Next, the effects of the embodiment that is configured as described above will be described.

The protectors 20 of this embodiment each include the housing portion 24 in which the connecting portions 15 where the first wires 11F, which are inserted through the inside of the pipe 10, and the second wires 11S, which are disposed outside the pipe 10, are connected can be housed outside the pipe 10. With this configuration, the connecting portions 15, where the first wires 11F and the second wires 11S are connected, are housed in and protected by the housing portion 24 of the protector 20, and thus, the connecting portions 15, where the first wires 11F and the second wires 11S are connected, need not be housed in the pipe 10. Accordingly, it is possible to protect the connecting portions 15, where the first wires 11F inserted through the inside of the pipe 10 and the second wires 11S disposed outside the pipe 10 are connected, without increasing the diameter of the pipe 10.

Moreover, the protectors 20 each have the displacement restricting portion 29 that comes into contact with the outer circumferential surfaces of the first wires 11F and restrict the displacement of the first wires 11F in the radial direction. With this configuration, it is possible to prevent the first wires 11F from being displaced in the radial direction, abutting against the end edges of the pipe 10, and thus being damaged.

Moreover, the protectors 20 each have the bending restricting portion 32 that comes into contact with the outer circumferential surfaces of the second wires 11S and restrict the bending of the second wires 11S. With this configuration, it is possible to reliably prevent a force that is generated by the second wires 11S being shaken from acting on the connecting portions 15.

Moreover, the protectors 20 each include the first stopper portion 36F and the second stopper portion 36S that engage with the axial end edges of the insulating members 16 and prevent the connecting portions 15 from coming out. With this configuration, it is possible to keep the connecting portions 15 within the housing portion 24.

Moreover, the axial clearances 37 are provided between the housing portion 24 and the connecting portions 15. With this configuration, the dimensional tolerance or the like can be accommodated.

Embodiment 2

Next, a wire harness 50 according to Embodiment 2 of the present disclosure will be described with reference to FIGS. 12 to 18.

The wire harness 50 of this embodiment differs from that of Embodiment 1 in that a pipe 51 can be divided over the entire length thereof. Note that the same components as those of Embodiment 1 are denoted by the same reference numerals, and redundant descriptions thereof are omitted.

As is the case with Embodiment 1, the wire harness 50 according to this embodiment includes the pipe 51, the first wires 11F that are inserted through the inside of the pipe 51, the second wires 11S that are disposed outside the pipe 51, and the protectors 20 that are attached to the end portions of the pipe 51, and the protectors 20 each include the housing portion 24 in which the connecting portions 15 where the first wires 11F and the second wires 11S are connected can be housed outside the pipe 51.

Figure 18:
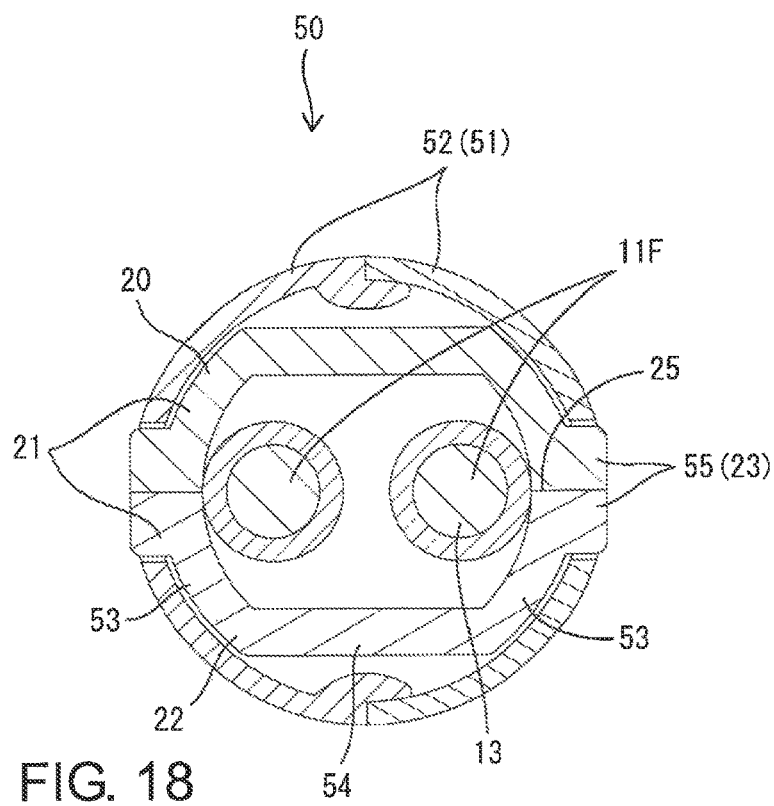
FIG. 18 is a cross-sectional view showing the wire harness with the protector attached thereto and corresponds to the cross section at the position indicated by arrows D-D in FIG. 15.

As shown in FIG. 18, the pipe 51 includes a pair of half split bodies 52 that have a semicircular cross-sectional shape. The pair of half-split bodies 52 have identical shapes. The pair of half-split bodies 52 are combined with each other with both end surfaces of one half-split body 52 in the circumferential direction abutting against those of the other half-split body 52.

As is the case with Embodiment 1, the engagement receiving portions 12 into which the engagement portions 23 of the protectors 20 can be fitted are provided in both axial end portions of the half-split bodies 52. The engagement receiving portions 12 are provided at respective central portions of the half-split bodies 52 in the circumferential direction.

As shown in FIG. 18, the fixing portion 22 of each protector 20 can be internally fitted to an end portion of the pipe 51, and includes first wall portions 53 that are disposed along the inner circumferential surface of the pipe 51 and a second wall portion 54 that is disposed spaced apart from the inner circumferential surface of the pipe 51. The first wall portions 53 are curved and form a circular arc shape that conforms to the inner circumferential surface of the pipe 51, and protrude toward one side from both end edges of the second wall portion 54 in the width direction. In a state in which the divided bodies 21 are combined, adjacent first wall portions 53 are continuously connected to each other and together form a circular arc shape, and the second wall portions 54 are substantially parallel to each other and oppose each other. In a state in which the protector 20 is attached to the end portion of the pipe 51, the second wall portions 54 are disposed at a distance from joint portions of the half-split bodies 52.

As is the case with Embodiment 1, the fixing portion 22 is provided with the engagement portions 23 that can be fitted into the engagement receiving portions 12 of the pipe 51 (see FIG. 18). The engagement portions 23 are protrusions that protrude from the outer circumferential surface of the fixing portion 22, and are each constituted by half-split engagement portions 55 that are divided by the abutment surface 25. The half-split engagement portions 55 are provided at protruding end portions of the respective first wall portions 53, and each have a flat column-like shape with a semicircular cross section. The half-split engagement portions 55 are joined to each other as a result of the divided bodies 21 being combined, and form the engagement portions 23 with a circular cross section that matches the respective engagement receiving portions 12.

Figure 16:
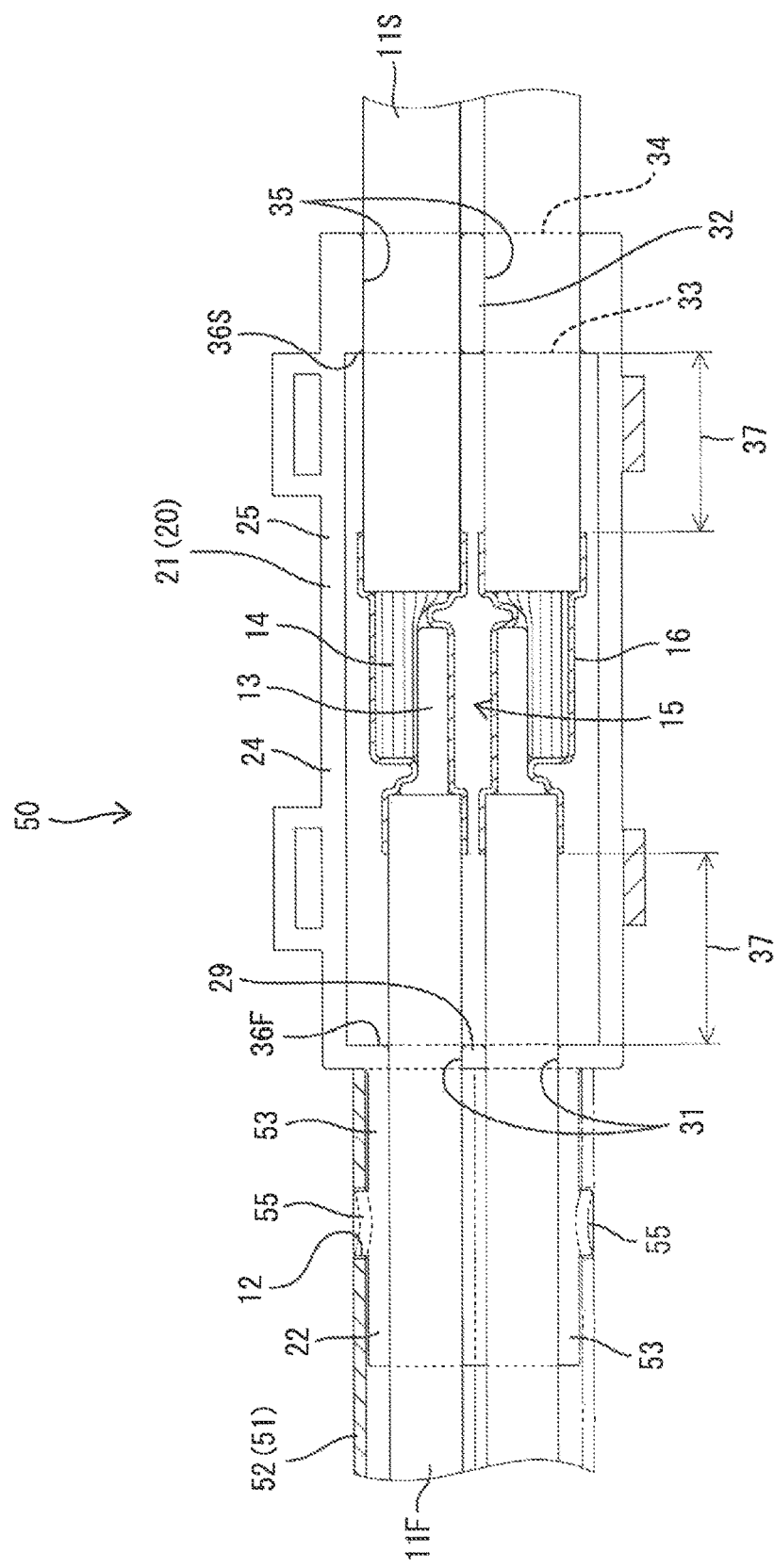
FIG. 16 is a partially enlarged cross-sectional view showing the wire harness with the divided body of the protector attached thereto.
Figure 17:
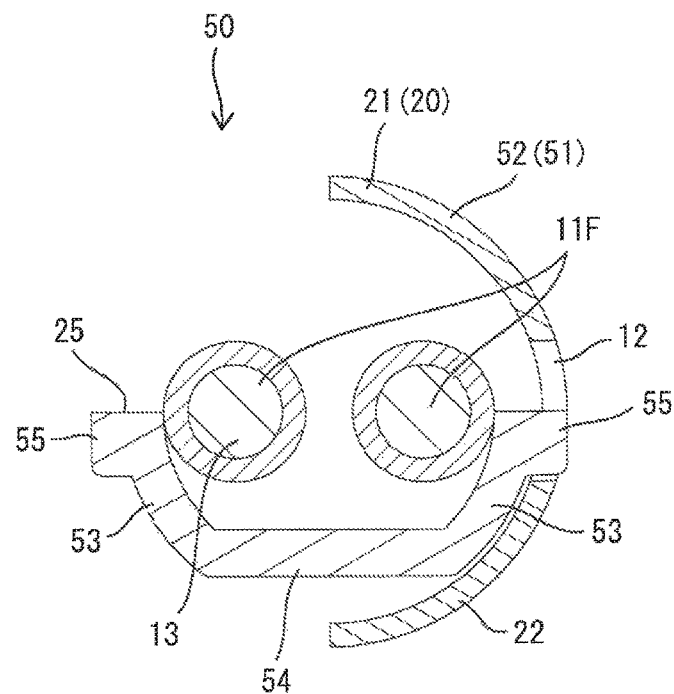
FIG. 17 is a cross-sectional view showing the wire harness with the divided body of the protector attached thereto and corresponds to a cross section at a position indicated by arrows D-D in FIG. 15.

As is the case with Embodiment 1, the axial clearances 37 are provided between the housing portion 24 and the connecting portions 15 (see FIG. 16). These clearances 37 are set to be large in the axial direction compared with those of Embodiment 1.

To manufacture the wire harness 50 of Embodiment 2, first, the first wires 11F are connected to the second wires 11S at both end portions.

Then, the divided bodies 21 are respectively assembled to both end portions of one half-split body 52. When the half-split engagement portions 55 are fitted into approximately half portions of the respective engagement receiving portions 12, end surfaces of the pipe 51 are abutted against or in close proximity to end surfaces of the housing portions 24 of the respective divided bodies 21.

Next, the first wires 11F are disposed along the inner circumferential surface of the one of the half split bodies 52, the first wires 11F are fitted into the first fitting portions 31, the second wires 11S are fitted into the second fitting portions 35, and the connecting portions 15 are disposed inside the housing portions 24.

Next, the other half-split body 52 and the other divided bodies 21 are attached. The half-split engagement portions 55 of the divided bodies 21 are fitted into the free spaces of the engagement receiving portions 12 of the pipe 51, and the lock structures 26 of the divided bodies 21 are locked. The half-split engagement portions 55 are fitted into the free spaces of the engagement receiving portions 12 with practically no gaps being created. Also, the abutment surfaces 25 of the divided bodies 21 abut against each other, the first fitting portions 31 and the second fitting portions 35 of the attached divided bodies 21 are fitted to the first wires 11F and the second wires 11S, and the connecting portions 15 are housed in the housing portions 24 in a hermetically sealed manner.

After that, abutment surfaces of the half-split bodies 52 are integrated through welding or the like, and the pipe 51 is bent using a bending machine. Thus, the operation for manufacturing the wire harness 50 is completed.

As described above, in this embodiment, the protectors 20 each include the housing portion 24 in which the connecting portions 15 where the first wires 11F and the second wires 11S are connected can be housed outside the pipe 51. Thus, as is the case with Embodiment 1, it is possible to protect the connecting portions 15, where the first wires 11F that are inserted through the inside of the pipe 51 and the second wires 11S that are disposed outside pipe 51 are connected, without increasing the diameter of the pipe 51. Moreover, the pipe 51 can be divided over the entire length thereof. Thus, the operation for inserting the first wires 11F all the way from one end to the other end of the pipe 51 need not be performed, and therefore, the operation for manufacturing the wire harness 50 can be easily performed.

Other Embodiments

The present disclosure is not limited to the foregoing embodiments that have been described above and illustrated in the drawings, and, for example, the following embodiments are also embraced within the technical scope of the present disclosure.

(1) In the foregoing embodiments, the second wires 11S are connected to both end portions of the first wires 11F, and the protectors 20 are attached to both end portions of the pipe 10 (51). However, the present disclosure is not limited to this, and a configuration may also be adopted in which a second wire is connected to only one end portion of a first wire, and a protector is attached to only one end side of a pipe.

(2) In the foregoing embodiments, the pipe 10 has a perfectly circular cross-sectional shape. However, the present disclosure is not limited to this, and the pipe may have any desired cross-sectional shape, such as an ellipse, an oval, or a rectangle, and in such a case, the shape of the fixing portion of a protector can be set to be a shape corresponding to the shape of the pipe.

(3) In the foregoing embodiments, the pipe 10 (51) is made of a metal. However, the present disclosure is not limited to this, and the pipe may also be made of a conductive resin or a resin or may have a layered structure composed of a metal and a resin, for example.

(4) In the foregoing embodiments, the diameter of the first wires 11F is relatively small, and the diameter of the second wires 11S is relatively large. However, the present disclosure is not limited to this, and the diameter of the first wires and the diameter of the second wires may be equal to each other, for example.

(5) In the foregoing embodiments, the first wires 11F are single-core wires, and the second wires 11S are stranded wires. However, the present disclosure is not limited to this, and the types of the first wires and the second wires can be changed as desired.

(6) In the foregoing embodiments, a pair of divided bodies 21 have identical shapes. However, the present disclosure is not limited to this, and a pair of divided bodies may have different shapes.

(7) In the foregoing embodiments, the insulating members 16 are shrinkable tubes. However, the present disclosure is not limited to this, and an insulating member may be formed by wrapping a piece of tape or may be a molded resin or the like, for example.

(8) In the foregoing embodiments, the connecting portions 15 are enclosed by the insulating members 16. However, the present disclosure is not limited to this, and a connecting portion is not necessarily required to be enclosed by an insulating member, and, for example, a protector may be provided with an insulating structure.

(9) In the foregoing embodiments, the bending restricting portion 32 has a thick wall-like shape. However, the present disclosure is not limited to this, and, for example, a hollow portion may also be provided in a middle portion of a bending restricting portion in the thickness direction.

(10) In the foregoing embodiments, both the first fitting portions 31 and the second fitting portions 35 have circular are shapes that conform to the outer shapes of the wires 11F and 11S. However, the present disclosure is not limited to this, and first fitting portions or second fitting portions may also have a square shape into which respective wires can be fitted, for example.

(11) In the foregoing embodiments, the displacement restricting portion 29 is disposed in close proximity to an end surface of the pipe 10 (51). However, the present disclosure is not limited to this, and a displacement restricting portion may also be disposed in a position away from the end surface of the pipe, and even in such a case, the displacement of first wires is restricted, and thereby the first wires can be prevented from coming into contact with the end surface of a pipe.

The invention claimed is:

1. A protector configured to be attached to an end portion of a pipe, the protector comprising
a housing in which a connector where a first wire that is inserted through an inside of the pipe and a second wire that is disposed outside the pipe are connected to each other can be housed outside the pipe, and
a displacement restrictor that can restrict displacement of the first wire in a radial direction by coming into contact with an outer circumferential surface of the first wire.

2. A wire harness comprising:
a pipe;
a first wire that is inserted through an inside of the pipe;
a second wire that is disposed outside the pipe;
the protector according to claim 1;
an insulator that encloses a connector where the first wire and the second wire are connected to each other; and
a stopper that is provided in the protector and prevents the connector from coming out by engaging with an axial end edge of the insulator.

3. A wire harness comprising:
a pipe;
a first wire that is inserted through an inside of the pipe;
a second wire that is disposed outside the pipe; and
the protector according to claim 1,
wherein an axial clearance is provided between the housing and the connector.

4. The wire harness according to claim 2, wherein the pipe can be divided over an entire length thereof.

5. A protector configured to be attached to an end portion of a pipe, the protector comprising
a housing in which a connector where a first wire that is inserted through an inside of the pipe and a second wire that is disposed outside the pipe are connected to each other can be housed outside the pipe, and
a bending restrictor that can restrict bending of the second wire by coming into contact with an outer circumferential surface of the second wire.

6. The protector according to claim 5, wherein the bending restrictor has a relatively large thickness compared with other portions.

* * * * *